United States Patent
Takeyama

(10) Patent No.: US 10,665,885 B2
(45) Date of Patent: May 26, 2020

(54) VEHICLE WITH FUEL CELL UNIT

(71) Applicant: TOYOTA JIDOSHA KABUSHIKI KAISHA, Toyota-shi, Aichi (JP)

(72) Inventor: Makoto Takeyama, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 77 days.

(21) Appl. No.: 15/937,350

(22) Filed: Mar. 27, 2018

(65) Prior Publication Data
US 2018/0294504 A1    Oct. 11, 2018

(30) Foreign Application Priority Data

Apr. 10, 2017  (JP) ................. 2017-077465

(51) Int. Cl.
| | |
|---|---|
| *H01M 8/2485* | (2016.01) |
| *B60K 1/04* | (2019.01) |
| *B60L 50/72* | (2019.01) |
| *H01M 8/04082* | (2016.01) |
| *B60L 50/71* | (2019.01) |

(Continued)

(52) U.S. Cl.
CPC ............ *H01M 8/2485* (2013.01); *B60K 1/04* (2013.01); *B60L 3/0007* (2013.01); *B60L 50/70* (2019.02); *B60L 50/71* (2019.02); *B60L 50/72* (2019.02); *H01M 8/04201* (2013.01);
(Continued)

(58) Field of Classification Search
CPC ............ H01M 8/2485; H01M 8/2484; H01M 8/04201; H01M 2250/20; H01M 8/04; H01M 8/24; H01M 8/002; H01M 2/02; H01M 2/12; B60K 1/04;
(Continued)

(56) References Cited

U.S. PATENT DOCUMENTS

| | | | |
|---|---|---|---|
| 6,306,531 B1* | 10/2001 | Clingerman | ............ C01B 3/323 |
| | | | 429/416 |
| 6,608,463 B1* | 8/2003 | Kelly | ................. H01M 8/04089 |
| | | | 320/101 |
| 2013/0017470 A1 | 1/2013 | Hotta et al. | |

FOREIGN PATENT DOCUMENTS

| | | |
|---|---|---|
| JP | 2006-107979 A | 4/2006 |
| JP | 2010-232189 A | 10/2010 |

(Continued)

OTHER PUBLICATIONS

Hiroshi Kanazawa, Nariyasu Miyanaga, Hiroyuki Sekine, Giichi Shimazu, Masahiro Takeshita, Toyota Motor Corp., Vehicle, Aug. 25, 2011, Google Patents, translated from Japanese (Year: 2011).*

(Continued)

*Primary Examiner* — Jonathan G Leong
*Assistant Examiner* — Ida Etemadi
(74) *Attorney, Agent, or Firm* — Dickinson Wright PLLC

(57) ABSTRACT

Provided is a vehicle with a fuel cell unit, specifically, a vehicle with a configuration in which a fuel cell unit is arranged anterior to a dashboard as well as a toe board located below the dashboard, where the fuel cell unit is arranged to be prevented from colliding with the toe board upon occurrence of unforeseen impact on the fuel cell unit. The fuel cell unit includes at least a fuel cell group, a stack manifold provided on the fuel cell group on the vehicle rear side, and an air valve device fixed to the stack manifold. The stack manifold has a recess portion formed in a part thereof. The air valve device is fixed to the stack manifold with at least a part of the air valve device received within the recess portion.

3 Claims, 4 Drawing Sheets

(51) Int. Cl.
*H01M 8/2484* (2016.01)
*B60L 3/00* (2019.01)
*B60L 50/70* (2019.01)

(52) U.S. Cl.
CPC ... *H01M 8/2484* (2016.02); *B60K 2001/0411* (2013.01); *H01M 2250/20* (2013.01); *Y02T 90/32* (2013.01)

(58) Field of Classification Search
CPC .. B60K 2001/0411; B60L 50/72; B60L 50/70; B60L 50/71; B60L 3/0007
See application file for complete search history.

(56) References Cited

FOREIGN PATENT DOCUMENTS

| | | | |
|---|---|---|---|
| JP | 2011-162108 A | | 8/2011 |
| JP | 2011162108 A | * | 8/2011 |
| JP | 5354026 B2 | | 11/2013 |
| JP | 2013-247083 A | | 12/2013 |

OTHER PUBLICATIONS

Nakagaki, N., "The Newly Developed Components for the Fuel Cell Vehicle, Mirai," SAE Technical Paper 2015-01-1174, 2015, doi: 10.4271/2015-01-1174. (Year: 2015).*

JSAE Exposition 2015: Toyota Mirai FCV cutaway model on display, Jun. 10, 2015, Automotive Industry Portal MarkLines, https://www.marklines.com/en/report_all/rep1406_201506#report_area_2 (Year: 2015).*

* cited by examiner

VEHICLE WITH FUEL CELL UNIT

CROSS REFERENCE TO RELATED APPLICATIONS

The present application claims priority from Japanese patent application JP 2017-077465 filed on Apr. 10, 2017, the content of which is hereby incorporated by reference into this application.

BACKGROUND

Technical Field

The present disclosure relates to a vehicle with a fuel cell unit.

Background Art

A vehicle that generates electricity with fuel cells mounted thereon and travels with an electric motor driven with the electricity, that is, a vehicle with a so-called fuel cell unit is known. Examples of such vehicles are described in JP 2013-247083 A and JP 2011-162108 A. In the vehicle described in JP 2013-247083 A, a fuel cell unit is disposed posterior to the driver seat of the vehicle. Meanwhile, in the vehicle described in JP 2011-162108 A, a fuel cell unit is disposed anterior to the dashboard that separates the vehicle cabin from the engine compartment. It should be noted that the term "anterior" or "front" as referred to in this specification means a position with respect to the forward moving direction of a vehicle, and the term "posterior" or "rear" means a position with respect to the backward moving direction of a vehicle.

A fuel cell unit usually includes, as described in JP 2010-232189 A and JP 5354026 B, fuel cells including a plurality of stacked unit cells; and a stack manifold (end plate) having various accessories for supplying the unit cells with hydrogen gas and oxidant gas that are necessary for the fuel cells to generate electricity, a cooling water channel, and the like. The accessories usually include an air valve device.

SUMMARY

Regarding a vehicle with a configuration in which a fuel cell unit is disposed anterior to a dashboard as well as a toe board located below the dashboard, such as the fuel cell vehicle described in JP 2011-162108 A, a sufficient space for arranging the fuel cell unit may not be secured within the engine compartment. In such a case, the gap between the rear side of the fuel cell unit and the toe board becomes small. With such a small gap, there is a possibility that if the fuel cell unit has moved backward upon occurrence of an impact force thereon from the front side due to an accident or the like, the fuel cell unit may collide with the toe board.

Such collision is required to be avoided to prevent unforeseen impact on the driver. As a solution to this, changing the position of at least the toe board located below the dashboard to a more rear side than those in the conventional vehicles is considered. However, such a solution will lead to a narrower space around the feet of the driver, and thus is not said to be preferable.

The present disclosure has been made in view of the foregoing, and exemplary embodiments relate to providing a vehicle with a fuel cell unit, specifically, a vehicle with a configuration in which a fuel cell unit is arranged anterior to a dashboard as well as a toe board located below the dashboard, where the fuel cell unit is arranged to be prevented from colliding with the toe board upon occurrence of unforeseen impact on the fuel cell unit without the space around the feet of the driver narrowed.

In order to solve the aforementioned problems, the inventor has carried out a detailed study of a vehicle with a fuel cell unit in practical use, in particular, a vehicle of a type in which a fuel cell unit is located anterior to a toe board of the vehicle. Then, the inventor has found that among various components attached to a stack manifold for currently available fuel cells to be mounted on vehicles, an air valve device is provided to improve the stack performance and the like through the control of the air flow-rating pressure. However, it is difficult to reduce the air valve device in size because it is rigid, it has a motor for driving the valve, a gear, and a valve element, and it requires a large torque motor and a large valve element for controlling a high flow-rating pressure, and performing defreezing, for example.

Meanwhile, a stack manifold attached to fuel cells is required to be a member with a certain thickness because it needs to have formed therein channels for cooling water and gas as described in JP 5354026 B and is also required to have a desired mechanical strength. The inventor has found that even when a cutout portion like a recess groove is formed in a part of a stack manifold with such a thickness, the stack manifold can operate without any interruption in its inherent functions to be implemented. The present disclosure is based on such finding obtained by the inventor.

That is, the present disclosure provides a vehicle with a fuel cell unit, in which the fuel cell unit is located anterior to a toe board of the vehicle, the fuel cell unit includes at least a fuel cell group, a stack manifold provided on the fuel cell group on the vehicle rear side, and an air valve device fixed to the stack manifold, the stack manifold has a recess portion formed in a part thereof, and the air valve device is fixed to the stack manifold with at least a part of the air valve device received within the recess portion.

According to an aspect of the vehicle with the fuel cell unit, the recess portion is formed in proximity to a peripheral edge of the stack manifold.

According to another aspect of the vehicle with the fuel cell unit, the stack manifold has a rectangular parallelepiped shape, and the recess portion is formed in proximity to an edge of the rectangular parallelepiped on its short side.

According to the present disclosure, a fuel cell unit that has, when mounted on a vehicle, a shorter length in the front-back direction of the vehicle than those of the conventional fuel cell units can be obtained. Accordingly, in the vehicle having the fuel cell unit in accordance with the present disclosure, even when the fuel cell unit has moved backward upon occurrence of an impact thereon, it is possible to effectively avoid the movement from influencing the driver by preventing a toe board from moving backward while securing the same space around the feet of the driver as those in the conventional vehicles.

DETAILED DESCRIPTION

Hereinafter, an embodiment of the present disclosure will be described with reference to the drawings.

Figure 1:
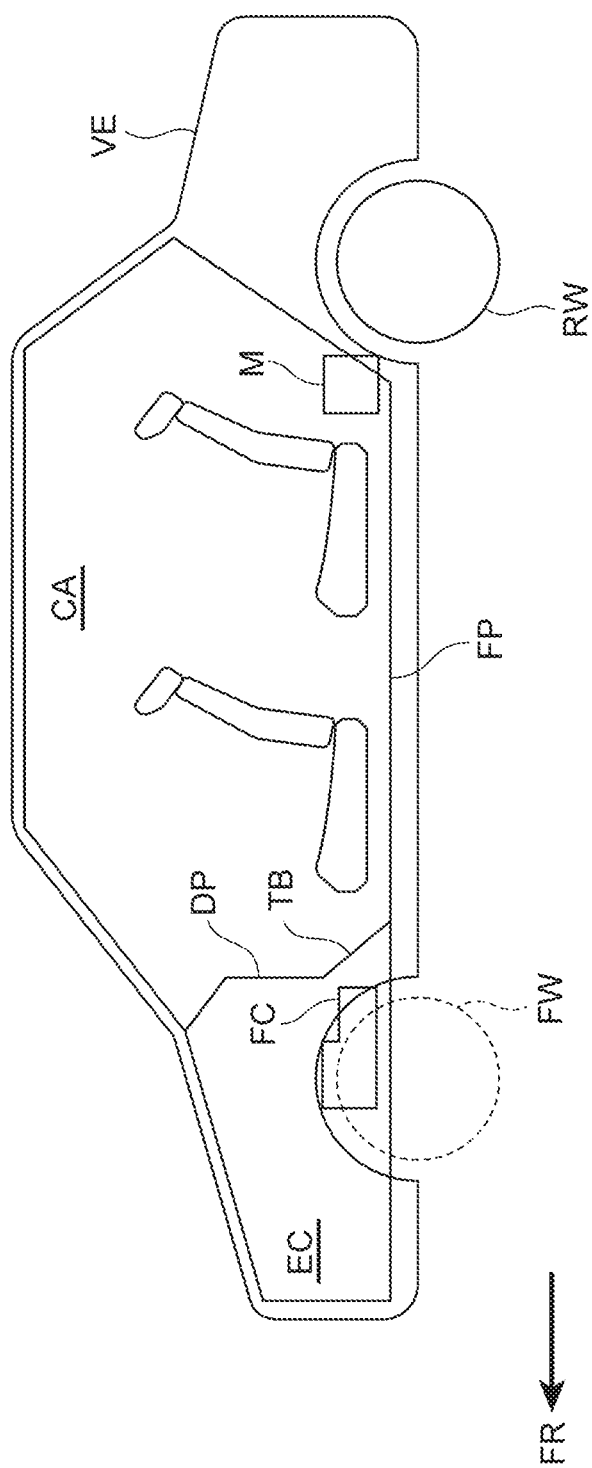
FIG. 1 is a cross-sectional view showing the schematic configuration of a vehicle with a fuel cell unit.

FIG. 1 is a cross-sectional view showing the schematic configuration of a vehicle in accordance with an embodiment. A vehicle VE is an electric vehicle with a fuel cell group FC, and includes an engine compartment EC, a vehicle cabin CA, a drive motor M, the fuel cell group FC, front wheels FW, and rear wheels RW. The engine compartment EC is disposed in the front portion of the vehicle. The vehicle cabin CA includes a dashboard DP, a toe board TB located below and connecting to the dashboard DP, and a floor panel FP. The vehicle cabin CA is disposed at the rear of the engine compartment EC with the dashboard DP and the toe board TB interposed therebetween. It should be noted that in FIG. 1, the direction indicated by the arrow FR is the forward moving direction of the vehicle VE. Specifically, the direction of the arrow FR is the "forward" or "anterior" direction, and the direction opposite thereto is the "backward" or "posterior" direction.

The drive motor M is located at the rear of the backseat, and drives the front wheels FW and/or the rear wheels RW in this example. It should be noted that the drive motor M and the rear wheels RW are connected together via a drive shaft (not shown) arranged below the floor panel FP. The torque of the drive motor M is transmitted to the rear wheels RW via the drive shaft.

The fuel cell group FC supplies electricity to the drive motor M. In addition, an accumulator that stores electricity generated is also provided, though not shown. A plurality of stacked polymer electrolyte fuel cells (unit cells) each including a MEA (Membrane Electrode Assembly) can be used as a fuel cell group FC in which an electromotive force is obtained upon occurrence of an electrochemical reaction between pure hydrogen, which is fuel gas, and air, which is oxidant gas, in each cell.

In the vehicle VE, the fuel cell group FC is attached to a portion of the floor panel FP within the engine compartment EC and in proximity to the toe board TB located below and connecting to the dashboard DP.

Figure 2:
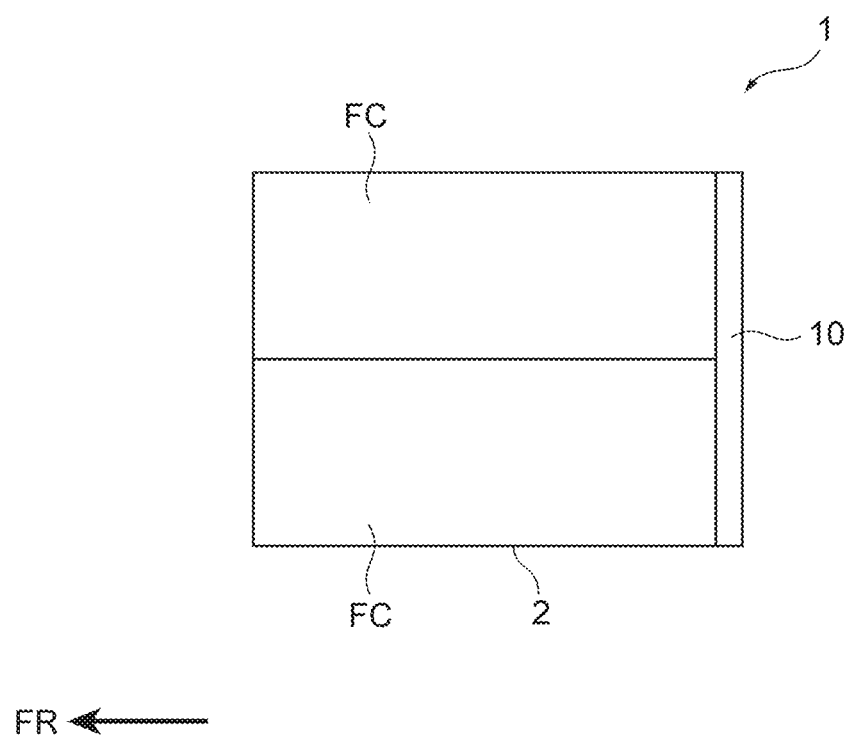
FIG. 2 is a plan view showing the schematic configuration of a fuel cell unit.

FIG. 2 is a plan view showing the schematic configuration of the fuel cell unit 1 including the fuel cell group FC in the vehicle VE, as seen from above in the view of FIG. 1. Specifically, the fuel cell group FC is configured such that a plurality of unit cells that are arranged in the upright position in the perpendicular direction are stacked in the front-back direction of the vehicle VE, and the fuel cell group FC is entirely housed within a box-shaped casing 2. A stack manifold 10 is arranged on the fuel cell group FC on the vehicle rear side. In this example, the stack manifold 10 forms a portion of the box-shaped casing 2 on the vehicle rear side. The stack manifold 10 is fixed to the fuel cell group FC and the casing 2 so that it can provide a compressive load to the stacked unit cells.

The stack manifold 10 is usually formed through aluminum die casting, and has a thickness of about 25 mm. The stack manifold 10 is used to have attached thereto accessories that are necessary for supplying pure hydrogen as fuel gas (anode gas) and air as oxidant gas (cathode gas) to the unit cells of the fuel cell group FC so that the unit cells can generate electricity through electrochemical reactions, and for discharging reacted gas. In addition, the stack manifold 10 has formed therein a cooling water channel for circulating cooling water.

Figure 3:
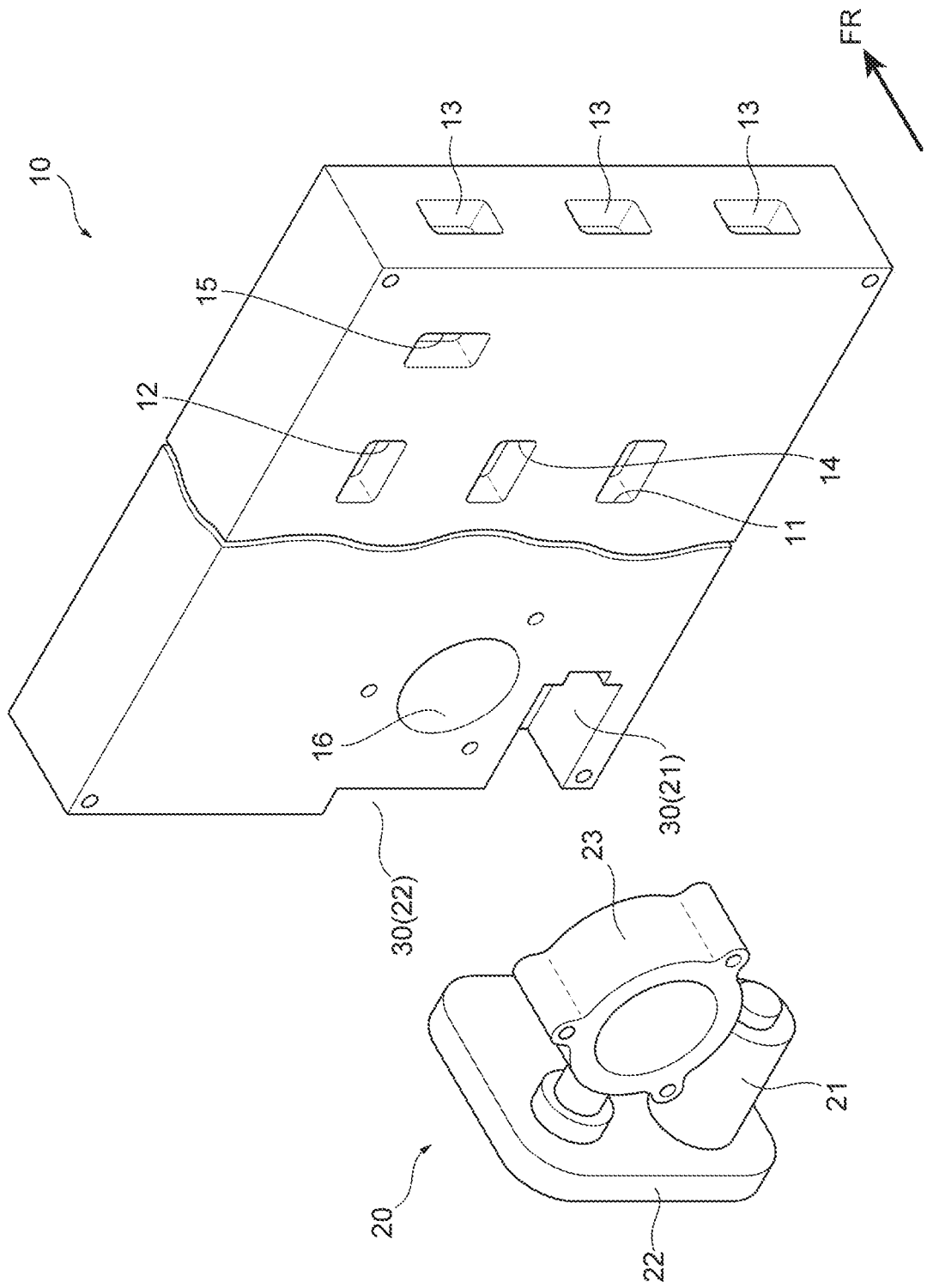
FIG. 3 is a perspective view showing examples of a stack manifold and an air valve device.

FIG. 3 is a perspective view showing an example of the stack manifold 10 as seen from its rear surface side. As shown in FIG. 3, the stack manifold 10 is provided with a cathode gas inlet 11, a cathode gas outlet 12, a cooling water inlet 13, a cooling water outlet 14, an anode gas inlet 15, an anode gas outlet 16, and the like. In addition, the stack manifold 10 has a cooling water channel formed on its rear surface side. As described above, in this embodiment, the stack manifold 10 shown in FIG. 3 is arranged on the fuel cell group FC on the vehicle rear side. In addition, the rear surface side of the stack manifold 10 is located in proximity to a surface of the toe board TB of the vehicle VE on the engine compartment EC side.

The stack manifold 10 shown in FIG. 3 has a rectangular parallelepiped shape, and the aforementioned anode gas outlet 16 is formed in proximity to an edge of the rectangular parallelepiped on its short side when the rear surface side of the stack manifold 10 is seen from the rear side of the vehicle VE. In addition, the anode gas outlet 16 has attached thereto an air valve device 20 with a shape shown in FIG. 3.

In this example, the air valve device 20 includes a motor portion 21, a gear portion 22, and a valve portion 23. Upon receipt of a signal from a vehicle control unit (not shown), the motor is rotated and the rotation is transmitted to the valve via the gear so that the valve performs required opening or closing operations. This type of air valve device 20 is a rigid body, and is usually larger than other accessories connected to the stack manifold 10. Therefore, the protrusion distance (length) of the air valve device 20 protruding beyond the rear surface of the stack manifold 10 determines the space in the front-back direction of the vehicle that is necessary for arranging the fuel cell unit 1 within the engine compartment EC.

Figure 4:
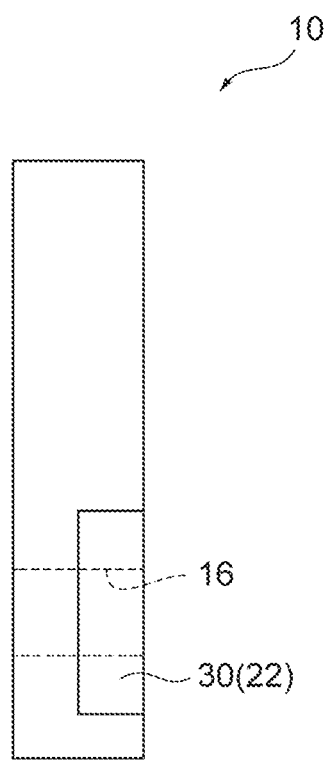
FIG. 4 is a side view of the stack manifold.

As shown in FIGS. 3 and 4, the stack manifold 10 has a recess portion 30, which is recessed from the rear surface toward the front surface side of the stack manifold 10, at a place where the air valve device 20 is to be attached (in this example, the anode gas outlet 16 and a position near the anode gas outlet 16).

In this example, the gear portion 22 of the air valve device 20 has a flat shape, and has housed therein a plurality of gears meshing with one another to transmit torque. The rotating shaft of the motor housed within the motor portion 21 is drive-coupled to one of the gears via a deceleration mechanism, and the valve housed within the valve portion 23 is coupled to the rotation center shaft of the other gear. An open plane of the valve portion 23 is flat, and the plane is orthogonal to the plane in which the two gears are arranged within the gear portion 22. In addition, a tip end side of the flat gear portion 22 protrudes more to the rear side than does the flat open plane of the valve portion 23 on the gas inlet side. Further, a part of the motor portion 21 also protrudes more to the rear side than does the flat open plane of the valve portion 23 on the gas inlet side.

In addition, the recess portion 30, which is recessed from the rear surface toward the front surface side of the stack manifold 10, is formed at a portion of the rear surface of the stack manifold 10 where the gear portion 22 and the motor portion 21 are to be positioned in attachment of the air valve device 20.

Specifically, when the air valve device 20 is attached to the stack manifold 10, the air valve device 20 is attached to the anode gas outlet 16 of the stack manifold 10 in a posture in which the gear portion 22 of the air valve device 20 is positioned on the left edge side of the stack manifold 10. As described above, the open plane of the valve portion 23 on the gas inlet side is flat, and the air valve device 20 and the stack manifold 10 are integrally fastened together using a set screw in a posture in which the flat plane abuts the rear surface of the stack manifold 10.

If the area of the rear surface of the stack manifold 10 to which the air valve device 20 is to be attached is flush with the other areas, it follows that after the air valve device 20 is attached to the stack manifold 10, the entire air valve device 20 protrudes beyond the rear surface of the stack manifold 10 toward the vehicle rear side, that is, toward the toe board TB side. However, the stack manifold 10 in the aforementioned embodiment has the recess portion 30, which is recessed from the rear surface side toward the front surface side of the stack manifold 10, at a portion where the motor portion 21 and the gear portion 22 are to be positioned in a region where the air valve device 20 is to be attached. Therefore, after the air valve device 20 is attached to the stack manifold 10, the motor portion 21 and the gear portion 22 of the air valve device 20 are received entirely or at least partially within the recess portion 30. Consequently, the amount of protrusion of the air valve device 20 in a state in which the air valve device 20 is attached to the stack manifold 10 is reduced by the distance (length) of each of the motor portion 21 and the gear portion 22 received within the recess portion 30.

The intended aim can be achieved as long as the size of the recess portion 30 in the plane direction is larger than the areas of the motor portion 21 and the gear portion 22 of the air valve device 20 that abut the stack manifold 10 when attached. However, in order not to lose the mechanical strength of the stack manifold 10, the shape of the recess portion 30 in the plane direction is preferably the same as the shape of the motor portion 21 and the gear portion 22 when the air valve device 20 is projected onto the rear surface of the stack manifold 10 in a posture attached thereto. In addition, the size of the recess portion 30 in the plane direction is desirably a size with the minimum insertion margin for inserting the motor portion 21 and the gear portion 22 of the air valve device 20 into a region around the projected shape. The depth of the recess portion 30 is not particularly limited, either, but the recess portion 30 is desirably deep in the thickness direction with the condition that the stack manifold 10 can maintain its required mechanical strength.

It should be noted that if the valve portion 23 has a large thickness in the configuration of the air valve device 20 used, a portion of the rear surface of the stack manifold 10 that is opposed to the valve portion 23 during attachment is desirably provided with a recess with a shape that conforms to the shape of the valve portion 23.

As described above, presetting the shape, size and depth of the recess portion 30 in the plane direction can form the recess portion 30 while suppressing the influence on the openings (for example, the cathode gas inlet 11 and the cathode gas outlet 12) formed in the rear surface of the stack manifold 10 and the cooling water channel formed in the front surface of the stack manifold 10 and also maintaining a required mechanical strength of the stack manifold 10.

It should be noted that the position in which the recess portion 30 for the air valve device 20 is to be formed can be determined from the positions of attachment of various accessories to the stack manifold 10 that are estimated from the overall design concept of the fuel cell unit 1, and the position of the recess portion 30 may not be around the peripheral edge of the stack manifold 10 in some cases as shown in FIG. 3. However, in the design phase, it is recommended that the overall layout be designed such that the recess portion 30 can be formed around the peripheral edge of the stack manifold 10 so that there will be no obstruction in the position where the cooling water channel is formed.

The peripheral edge of the stack manifold 10 is integrally fastened to the casing 2 with a bolt and the like, and bending stress is generated in the stack manifold 10 so as to hold the compressive load of the stacked unit cells, and stress concentrates on the peripheral edge of the stack manifold 10. In addition, when the stack manifold 10 has a rectangular parallelepiped shape as shown in FIG. 3, stress acting on the short sides is smaller than that on the long sides. Therefore, the overall layout of the fuel cell unit 1 is desirably designed such that the recess portion 30 for the air valve device 20 is arranged in proximity to an edge of the stack manifold 10 in the width direction and, in particular, when the entire fuel cell unit 1 or stack manifold 10 has a rectangular parallelepiped shape, in proximity to an edge of the stack manifold 10 on its short side.

As described above, the recess portion 30 is formed on the rear surface side of the stack manifold 10, and the air valve device 20 is fixed to the stack manifold 10 with at least a part of the air valve device 20 received within the recess portion 30, so that the length of the fuel cell unit 1 can be shortened by the length of the air valve device 20 received within the recess portion 30. Accordingly, design flexibility in the arrangement position of the fuel cell unit 1 within the engine compartment EC can be increased by the shortened length. This means that in a vehicle with a configuration in which the fuel cell unit 1 is arranged anterior to the toe board TB below the dashboard DP, an arrangement space that is required can be secured without the position of the toe board TB moved to the rear side or without the space around the feet of the driver narrowed. Consequently, collision of the fuel cell unit 1 with the toe board TB upon occurrence of unforeseen impact on the fuel cell unit 1 can be avoided.

Although the air valve device 20 is attached to the position of the anode gas outlet 16 of the stack manifold 10 in the aforementioned description, the position of attachment of the air valve device 20 is not limited thereto. There may also be cases where the air valve device 20 is attached to other portions (the cathode gas inlet 11, the cathode gas outlet 12, or the anode gas inlet 15) in accordance with the overall design concept of the fuel cell unit 1. In such cases, a recess portion for the air valve device is formed at a portion of the rear surface of the stack manifold 10 corresponding to the air valve device to be attached.

DESCRIPTION OF SYMBOLS

VE Vehicle
FC Fuel cell
EC Engine compartment
CA Vehicle cabin
FW Front wheels
RW Rear wheels
DP Dashboard
TB Toe board
FP Floor panel
M Drive motor
1 Fuel cell unit
2 Box-shaped casing
10 Stack manifold
11 Cathode gas inlet
12 Cathode gas outlet 13 Cooling water inlet
14 Cooling water outlet
15 Anode gas inlet
16 Anode gas outlet
20 Air valve device
21 Motor portion
22 Gear portion
23 Valve portion
30 Recess portion adapted to receive part of air valve device

What is claimed is:

1. A vehicle with a fuel cell unit,
wherein:
the fuel cell unit is located anterior to a toe board of the vehicle,
the fuel cell unit includes at least a fuel cell group, a stack manifold provided on a rear side of the fuel cell group the stack manifold has a rectangular parallelepiped shape having a short side and a long side defining a peripheral edge of a front surface and a rear surface, and an air valve device fixed to the stack manifold,
the air valve device includes a motor portion and a valve portion which opens and closes by a rotation of the motor portion,
the stack manifold has a recess portion, which is recessed from the rear surface partially toward the front surface of the stack manifold, formed in a part thereof, and
the air valve device is fixed to the stack manifold with at least a part of the motor portion received within the recess portion.

2. The vehicle with the fuel cell unit according to claim 1, wherein the recess portion is formed adjacent to the peripheral edge of the stack manifold.

3. The vehicle with the fuel cell unit according to claim 1, wherein:
the recess portion is formed adjacent to an edge of the rectangular parallelepiped on its short side.

\* \* \* \* \*